(12) United States Patent
Oertley

(10) Patent No.: US 6,416,142 B1
(45) Date of Patent: Jul. 9, 2002

(54) REDUCED SOUND TRANSMITTING IDLER FOR TRACK-TYPE VEHICLES

(75) Inventor: Thomas E. Oertley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/553,592

(22) Filed: Apr. 20, 2000

(51) Int. Cl.[7] ............................................. B60B 17/00
(52) U.S. Cl. ....................................... 305/137; 305/195
(58) Field of Search ................................. 305/136, 137, 305/194, 195, 199, 184; 474/160, 161, 212

(56) References Cited

U.S. PATENT DOCUMENTS

| | | | | |
|---|---|---|---|---|
| 683,583 A | * | 10/1901 | White | 301/42 |
| 1,451,872 A | * | 4/1923 | French | 301/42 |
| 3,989,314 A | * | 11/1976 | Reinsma et al. | 305/137 |
| RE30,039 E | * | 6/1979 | Clemens et al. | 305/136 |
| 4,818,041 A | * | 4/1989 | Oertley | 305/136 |
| 5,098,346 A | * | 3/1992 | Redmond | 474/161 |
| 5,203,861 A | * | 4/1993 | Irwin et al. | 474/161 |

* cited by examiner

*Primary Examiner*—Russell D. Stormer
(74) *Attorney, Agent, or Firm*—Diana L. Charlton; Robert A. McFall

(57) ABSTRACT

An idler for supporting the forward end of an endless track of a track-type tractor has an endless chain resiliently supported on an outer flange of the idler hub. An outer surface of the chain provides a substantially continuous bearing surface for support of the endless track supported by the idler.

16 Claims, 3 Drawing Sheets

Fig-3-
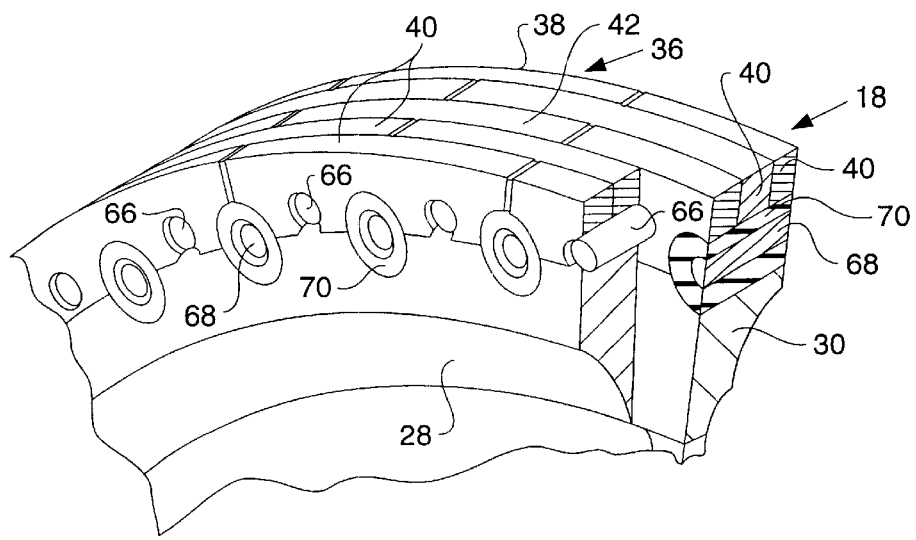
Fig-4-
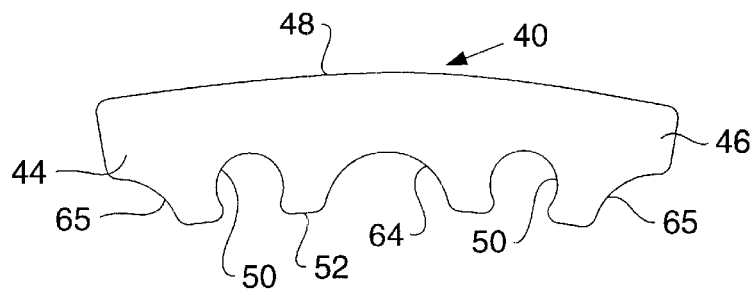
Fig-5-
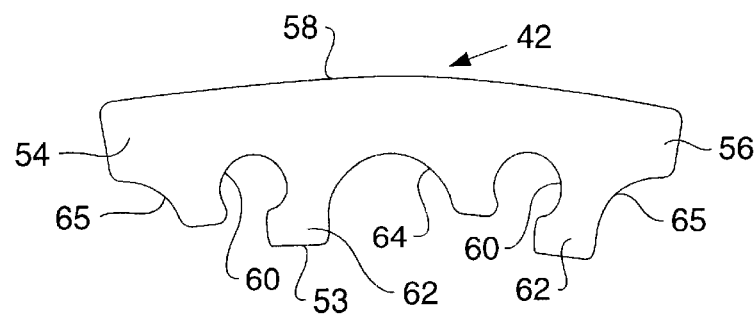

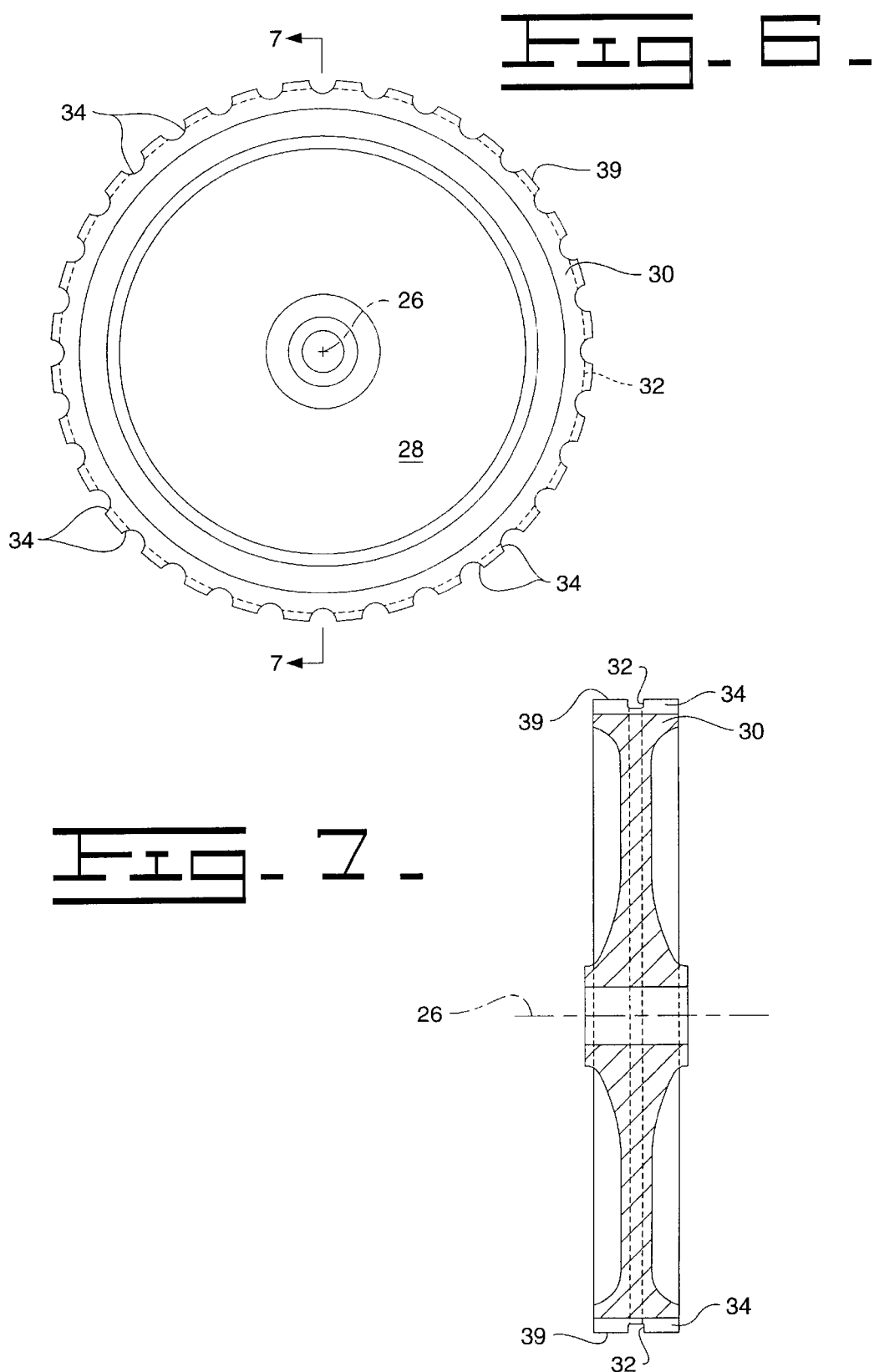

REDUCED SOUND TRANSMITTING IDLER FOR TRACK-TYPE VEHICLES

TECHNICAL FIELD

This invention relates generally to an undercarriage sound reducing idler for track-type vehicles and more particularly to such an idler that has a resiliently mounted tread surface on the idler.

BACKGROUND ART

Environmental regulations, both in the United States and in other countries, are increasingly being directed to the suppression of noise emitted by construction equipment such as track-type tractors. In track-type tractors, the undercarriage, i.e., the track assemblies, support rollers, track tensioning assemblies, drive sprockets and idlers, are frequently a major contributor to the overall noise signature of track type equipment.

A great amount of effort has been directed to noise abatement strategies in undercarriage assemblies. For example, U.S. Pat. No. 3,937,528 issued Feb. 10, 1976 to Donald E. Clemens et al., titled SEGMENTED AND CUSHIONED IDLER FOR TRACK-TYPE VEHICLES AND METHOD FOR CARRYING SAME, and assigned to the Assignee of the present invention, describes a support idler directed to reducing the noise level of an endless track during operation of a vehicle. More specifically, Clemens at al. describes an idler having a plurality of arcuate segments circumferentially mounted about a peripheral flange of the idler hub and an elastomeric strip disposed between each of the arcuate segments and the peripheral flange. Each of the arcuate segments is mounted to the peripheral flange by a plurality of bolts. However, during vehicle operation, the elastomeric strips interposed between the arcuate segments and the peripheral flange are compressed during each rotation of the idler. The resultant resilient cyclic compression and recovery of the elastomeric strip during operation of the vehicle eventually results in relaxation of the bolt tension, or stretch, developed when mounting the arcuate segments on the hub flange. This may cause the attachment bolts to eventually loosen. The present invention is directed to overcoming such problems.

DISCLOSURE OF THE INVENTION

In accordance with one aspect of the present invention, a track-type vehicle has endless tracks mounted on opposite sides with an idler entrained within a forward portion of each of the endless tracks. The idler has hub with an annular flange and an endless chain resiliently mounted on the annular flange. The endless chain forms a rim that provides a substantially continuous peripheral bearing surface about the idler.

In another aspect of the present invention, a track-type vehicle idler is disposed for rotation about an axis of the idler and has a hub with an annular flange and an endless chain resiliently mounted on the annular flange. The resiliently mounted endless chain forms a rim that provides a substantially continuous peripheral bearing surface for an endless track supported by the idler.

BRIEF DESCRIPTION OF THE DRAWINGS

A more complete understanding of the structure and operation of the present invention may be had by reference to the following detailed description when taken in conjunction with the accompanying drawings, wherein:

FIG. 3 is an enlarged three-dimensional view of a portion of the idler embodying the present invention, with a portion of the outer two rows of arcuate segments cut away to better show details of the center arcuate segment;

FIG. 4 is a side view of the outer segments of the endless chain of the idler embodying the present invention;

FIG. 5 is a side view of the center segments of the endless chain of the idler embodying the present invention;

FIG. 6 is an elevational view of the hub of the idler embodying the present invention; and FIG. 7 is a cross-sectional view of the hub of the idler embodying the present invention, taken along the line 7—7 of FIG. 6.

BEST MODE CARRYING OUT THE INVENTION

Figure 1:
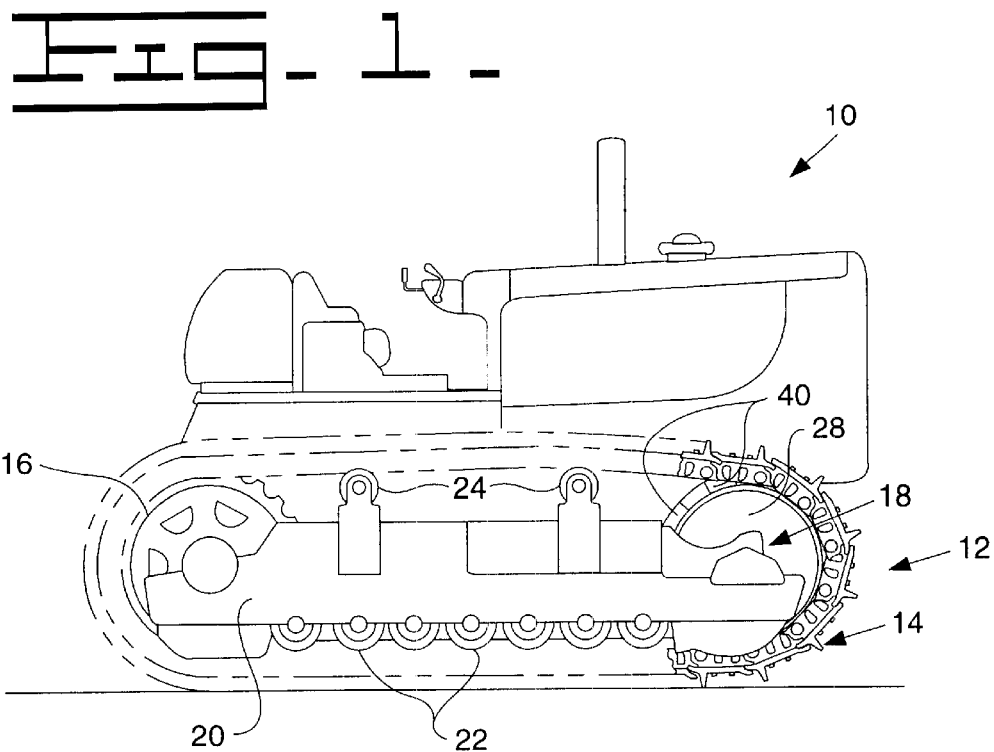
FIG. 1 is a side elevational view of a track-type tractor having a reduced sound transmitting idler embodying the present invention.

FIG. 1 illustrates a track-type tractor 10 having a pair of endless track assemblies 12, one of which is shown, mounted on respective sides of the tractor 10. Each track assembly 12 has an endless track 14 entrained about a drive sprocket 16 at the rearward end of the tractor 10, and about an idler 18 embodying the present invention at the forward end. The idler 18 is rotatably mounted on a sub-frame 20 that has a plurality of track rollers 22 rotatably mounted thereon, along with a plurality of carrier rollers 24, in a conventional manner.

The sound reducing idler 18 embodying the present invention is illustrated in FIGS. 2–7. The idler 18 rotates about an axis of rotation 26 and has a centrally disposed hub portion 28 which has an annual flange 30 disposed about the outer circumferential periphery of the hub 28. The annular flange 30 has an annular groove 32 defined in the outer peripheral surface of the flange 30 and a plurality of spaced-apart, circular openings 34 also defined in the outer periphery of the flange 30. The circular openings 34 extend in a direction parallel with the axis 26 of the idler 18 and intersect a portion of the annular groove 32 defined about the periphery of the flange 30.

The idler 18 also has an endless chain 36 of the type often referred to as a "silent chain", as disclosed by the American Standards Association Standard B29.2, resiliently mounted on the annular flange 30. The chain 36 forms a rim 38 that provides a substantially continuous peripheral bearing surface 38 about the idler 18 for the endless track 14.

The endless chain 36 is formed of a plurality of outer arcuate segments 40 arranged in at least two, and preferably four concentric bands about the flange 30 of the idler 18, and a plurality of center arcuate segments 42 arranged in a single band about the annular flange 30 of the idler 18, as illustrated in FIG. 3.

A typical one of the outer arcuate segments 40 is illustrated in FIG. 4. Each one of the outer arcuate segments 40 have a first end 44, a second end 46, a radially outward track bearing surface 48, and a pair of spaced-apart, axially oriented first spaced apart circular openings 50 extending inwardly from a radially inner surface 52 of the arcuate, or curved outer segments 40.

A representative one of the center arcuate segments 42 is shown in FIG. 5. The construction of the center arcuate segments 42 is similar to that of the outer arcuate segments 40. Each of the center arcuate segments 42 have spaced apart first and second ends 54, 56, an arcuately curved outer track bearing surface 58 and a pair of spaced apart circular openings 60 extending inwardly from a radially inner surface 53. The primary difference between the center arcuate segments 42 and the outer arcuate segments 40 are that each of the center segments 42 have a pair of radially inwardly extending tabs 62 adapted to be received within the annular groove 32 defined in the flange 30. Each of the outer segments 40 and the center segments 42 have a third centrally disposed circular opening 64 that is positioned substantially equidistantly between the respective first ends 44, 54 and second ends 46, 56 and extends inwardly from the radially innermost surface of the respective segments 40, 42. In addition, each of the outer and center segments 40, 42 have a portion 65 of the third circular openings 64 disposed at each of the first ends 44, 54 and second ends 46, 56 which cooperate with a leading or following segment 40,42 disposed in the same circular band, or row, to provide a full one of the third circular openings 64. Thus, each of the segments 40, 42, have a full third circular opening 64, and a pair of partial circular openings.

Figure 2:
FIG. 2 is an enlarged three-dimensional view of the idler embodying the present invention, showing the idler rotatably mounted on a portion of the subframe of the track-type tractor.

The endless chain 36 is first assembled by itself, and then mounted on the flange 30 of the idler 18 as illustrated in FIGS. 2 and 3. Advantageously, the arcuate segments 40, 42 are positioned with one of the pair of circular openings 50, 60 adjacent the first end 44 of one segment being aligned with the circular opening 50, 60 adjacent a second end of an adjacent segment 40, 42. Thus, adjacent rows of the segments 40, 42 are positioned so that the circular opening 50, 60 of one segment is aligned with the other one of the pair of circular openings 50, 60 at an opposite end of respective adjacently disposed segments.

The endless chain 36 is then assembled by inserting an articulation pin 66 through the respectively aligned openings 50, 60 in the outer and center segments 40, 42. The outer ends of each of the articulation pins 36 is desirably welded to the outer surface of the outermost arcuate segment 40. The assembled chain 36 is then installed over the flange 30 by aligning the inwardly extending tabs 62 of the center segments 42 with the openings 34 in the outer flange 30 of the idler hub 28. The chain 36 is then slid axially over the flange 30 until the inwardly extending tabs 62 are axially aligned with the annular groove 32 formed in the flange 30. After the chain 36 is axially aligned on the flange 30, it is rotated radially to bring the third circular openings 64, 65 provided in the segments 40, 42 into radial alignment with the circular openings 34 in the flange 30. At that position, the inwardly extending tabs 62 of the center segments 42 are positioned in the annular groove 32 between the circular openings 34.

After alignment of the third circular openings 64 in each of the segments 40, 42 with the axially extending circular openings 34 in the flange 30, the elastomeric bushings 70 are inserted into the aligned openings 64, 34, and then the locking pins 68 driven into the elastomeric bushings 70. The endless chain 36 is thereby resiliently supported on the hub 28 by a plurality of pins 68 disposed within respective elastomeric bushings 70 inserted within the axially aligned third circular openings 64 in the segments 40, 42 and the axially extending circular openings 34 defined in the flange 30 of the hub 28. The elastomeric bushings 70 are preferably formed of rubber or other elastomeric material that has relatively high compressive strength and wear resistance.

When assembled, the radially innermost surfaces 52, 53 of the endless chain 36 are supported a small distance away from a radially outermost surface 39 of the flange 30 by the elastomeric bushings 70. During operation of the vehicle and rotation of the idler 18, and consequent compression of the elastomeric bushings 70 by the weight of the vehicle and endless track 14, the amount of deflection of the elastomeric bushing 70 is limited by the initial free clearance between the radially innermost surfaces 52, 53 of the arcuate segments 40, 42 and the outer surface 38 of the flange 30. In an illustrative embodiment, a radial clearance of about 1–2 mm is provided between the outer peripheral surface 39 of the flange 30 and the radially innermost surfaces 52, 53 of the arcuate segments 40, 42 when assembled on the hub 28. The bottom surfaces of the radially inwardly extending tabs 62 of the center segments 42 are spaced a similar distance from the bottom of the annular groove 32 in the flange 30.

In the illustrated preferred embodiment of the present invention, the endless chain 36 is composed of two rows, or bands of outer circular segments 40 disposed on each side of a single band of center circular segments 42. In other embodiments, the chain 36 may be composed of fewer segments, for example a single band of outer arcuate segments 40 disposed on each side of a central band of center arcuate segments 42, or alternatively more than two adjacent bands of outer segments 40 on each side of the center band. It is desirable, regardless of the number of adjacent rows, or bands, of circular segments 40, 42 used to form the endless chain 36, that the pins 68 disposed within the elastomeric bushings 70 extend through at least three of the links 40, 42 disposed in adjacent relationship about the periphery of the flange 30. Also, although the pin 68 and resilient support bushings 70 are illustrated as having circular cross sections, other pin and/or bushing shapes, for example, oval, rectangular, octagonal or other cross-sectional shapes, could be used if so desired.

INDUSTRIAL APPLICABILITY

The reduced sound transmitting idler 18 embodying the present invention is particularly useful for use in the endless track assemblies of track-type vehicles working in construction areas that are sensitive to the amount of noise generated by construction equipment. The elastomeric bushings 70 positioned between the outer flange 30 of the hub 28 and the innermost surfaces 52, 53 of the linked arcuate segments 40, 42 provide an elastomeric cushion support for the chain 36 encompassing the idler 18. The radially outermost surfaces of the curved segments 40, 42 of the chain 36 provide bearing surfaces 48, 58 for the endless track 14 entrained about the idler 18 and the drive sprocket 16. More specifically, the elastomeric bushings 70 provide a cushion support of the circular segments 40, 42 supporting the endless track 14, and thereby effectively limit the transmission of noise between the endless track 14 and the idler 18.

LIST OF ELEMENTS REDUCED SOUND
IDLER FOR TRACK TYPE MACHINES CAT
FILE NO. 99–750

10 tractor
12 endless track assembly
14 endless track
16 drive sprocket
18 idler
20 sub-frame
22 track rollers
24 carrier rollers
26 axis of rotation
28 hub (of 18)
30 flange (of 28)

32 annular groove
34 circular opening
36 chain
38 rim (continuous bearing surface (for 14))
39 radially outer
surface (of 30)
40 outer arcuate segments
42 center arcuate segment
44 first end (of 40)
46 second end (of 40)
48 outer track bearing surface (of 40)
50 pair of circular opening (in 40)
52 radially inner surface (of 40)
53 radially inner surface (of 42)
54 first end (of 42)
56 second end (of 42)
58 outer track bearing surface (of 42)
60 pair of circular openings (of 42)
62 radially inwardly extending tabs (of 42)
64 third circular openings (of 40 and 42)
65 portions (of 64) at ends of 40,42
66 articulation pins
68 pins
70 elastomeric bushings

What is claimed is:

1. In a track-type vehicle having an endless track mounted on opposite sides thereof, a forward portion of each of the endless tracks being supported by a respective idler disposed for rotation about an axis thereof, the improvement wherein said idler comprises a hub having an annular flange and an endless chain resiliently mounted on said annular flange, said endless chain having a plurality of interconnected segments that provide a substantially continuous bearing surface for said endless track about said idler.

2. In a track-type vehicle having an endless track mounted on opposite sides thereof, a forward portion of each of the endless tracks being supported by a respective idler disposed for rotation about an axis thereof, the improvement wherein said idler comprises a hub having an annular flange and an endless chain resiliently mounted on said annular flange, said endless chain having a plurality of interconnected segments that provide a substantially continuous bearing surface for said endless track about said idler, the annular flange of the hub has an annular groove defined about the periphery of said flange and a plurality of spaced-apart axially extending circular openings defined in the periphery of said flange.

3. The vehicle of claim 2, wherein a portion of each of said spaced-apart, axially extending openings in said flange intersect a portion of said annular groove defined about the periphery of said flange.

4. The vehicle of claim 2, wherein said plurality of segments are curved with each segment having a track bearing surface disposed on a radially outer surface and a pair of spaced-apart, axially oriented circular openings extending inwardly from a radially inner surface of the respective curved segment, each of said circular openings defining a respective pivot point of the segment in which the openings are defined, and a plurality of pins each of which extend through the circular openings of at least three segments disposed in axially adjacent relationship about the periphery of said flange.

5. The vehicle of claim 4, wherein each of said plurality of segments have at least one axially oriented third circular opening extending inwardly from the radially inner surface of the respective curved segment, said axially oriented third circular openings being radially aligned with respective ones of the axially extending circular openings defined in the periphery of the flange of said hub.

6. The vehicle of claim 5, wherein at least a portion of the third circular openings in at least three axially adjacently disposed segments and a respective radially aligned circular opening defined in the periphery of said flange cooperate to define a circular bore, and said idler includes a pin disposed within an elastomeric bushing extending through each of said circular bores.

7. The vehicle of claim 6, wherein the radially inner surface of each of said segments is biasedly supported in radially spaced relationship with an outer peripheral surface of said flange by said elastomeric bushings.

8. The vehicle of claim 4, wherein the annular flange of the hub of said idler has an annular groove defined about the periphery of said flange, and a centrally disposed one of said at least three axially adjacent segments has a radially inwardly extending tab adapted to be received within said annular groove defined in the periphery of said flange.

9. A track-type vehicle idler disposed for rotation about an axis thereof, the improvement comprising:
a hub having an annular flange and an endless chain resiliently mounted on said annular flange, said endless chain having a plurality of interconnected segments that form a substantially continuous peripheral bearing surface about said idler.

10. A track-type vehicle idler disposed for rotation about an axis thereof, the improvement comprising:
a hub having an annular flange and an endless chain resiliently mounted on said annular flange, said endless chain having a plurality of interconnected segments that form a substantially continuous peripheral bearing surface about said idler, the annular flange of said hub has an annular groove defined about the periphery of the flange and a plurality of spaced-apart, axially extending, circular openings defined in the periphery of said flange.

11. The idler of claim 10, wherein said plurality of segments are curved with each segment having a track bearing surface disposed on a radially outer surface and a pair of spaced-apart, axially oriented circular openings extending inwardly from a radially inner surface of the respective curved segment, each of said circular openings defining a respective pivot point of the segment in which the openings are defined, and a plurality of pins each of which extend through the circular openings of at least three segments disposed in axially adjacent relationship about the periphery of said flange.

12. The idler of claim 11, wherein each of said plurality of segments have at least one axially oriented third circular opening extending inwardly from the radially inner surface of the respective curved segment, said axially oriented third circular openings being radially aligned with at least portions of respective ones of the axially extending circular openings defined in the periphery of the flange of said hub.

13. The idler of claim 12, wherein each of the third circular openings in said segments and a respective radially aligned circular opening defined in the periphery of said flange cooperate to define a plurality of circular bores, and said idler includes a pin disposed within an elastomeric bushing extending through each of said circular bores.

14. The idler of claim 13, wherein the radially innermost surface of each of said segments is biasedly supported in radially spaced relationship with an outer peripheral surface of said flange by said elastomeric bushings.

15. The idler of claim 14, wherein the annular flange of the hub of said idler has an annular groove defined about the periphery of said flange, and a centrally disposed one of said at least three axially adjacent segments has a radially inwardly extending tab adapted to be received within said annular groove defined in the periphery of said flange.

16. A track-type vehicle idler disposed for rotation about an axis thereof, the idler comprising:

a hub having an annular flange with a groove defined about a portion of the periphery of the annular flange;

an endless chain resiliently mounted on the annular flange, the endless chain having a plurality of interconnected segments that form a substantially continuous peripheral bearing surface about the idler; and a plurality of spaced-apart, axially extending, openings defined in the periphery of the flange.

\* \* \* \* \*